US008438619B2

(12) United States Patent
Olson

(10) Patent No.: US 8,438,619 B2
(45) Date of Patent: May 7, 2013

(54) NETWORK ACCESS CONTROL

(75) Inventor: Erik Olson, Seattle, WA (US)

(73) Assignee: NetMotion Wireless Holdings, Inc., Seattle, WA (US)

( * ) Notice: Subject to any disclaimer, the term of this patent is extended or adjusted under 35 U.S.C. 154(b) by 1456 days.

(21) Appl. No.: 11/859,336

(22) Filed: Sep. 21, 2007

(65) Prior Publication Data

US 2009/0083835 A1    Mar. 26, 2009

(51) Int. Cl.
*G06F 7/00* (2006.01)

(52) U.S. Cl.
USPC .............. 726/6; 726/1; 726/2; 726/3; 726/4; 726/27; 713/151; 713/152; 713/154; 713/156; 713/166

(58) Field of Classification Search ................... 726/6, 1, 726/2, 3, 4, 27; 713/151, 152, 154, 156, 713/166
See application file for complete search history.

(56) References Cited

U.S. PATENT DOCUMENTS

| 6,418,324 | B1 | | 7/2002 | Doviak et al. | |
|---|---|---|---|---|---|
| 6,499,110 | B1 | * | 12/2002 | Moses et al. | 726/1 |
| 6,546,425 | B1 | | 4/2003 | Hanson et al. | |
| 6,735,701 | B1 | * | 5/2004 | Jacobson | 726/1 |
| 7,346,922 | B2 | * | 3/2008 | Miliefsky | 726/3 |
| 7,360,237 | B2 | * | 4/2008 | Engle et al. | 726/1 |
| 7,428,753 | B2 | * | 9/2008 | Engle et al. | 726/12 |
| 7,526,792 | B2 | * | 4/2009 | Ross | 726/2 |
| 7,827,607 | B2 | * | 11/2010 | Sobel et al. | 726/22 |
| 8,104,077 | B1 | * | 1/2012 | Gauvin et al. | 726/12 |
| 2005/0010820 | A1 | * | 1/2005 | Jacobson | 713/201 |
| 2005/0278775 | A1 | * | 12/2005 | Ross | 726/2 |
| 2006/0005254 | A1 | * | 1/2006 | Ross | 726/27 |
| 2006/0130139 | A1 | * | 6/2006 | Sobel et al. | 726/22 |
| 2006/0259328 | A1 | * | 11/2006 | Burd et al. | 705/2 |
| 2007/0101405 | A1 | * | 5/2007 | Engle et al. | 726/4 |
| 2007/0124803 | A1 | * | 5/2007 | Taraz | 726/4 |
| 2007/0261121 | A1 | * | 11/2007 | Jacobson | 726/26 |
| 2008/0086533 | A1 | * | 4/2008 | Neuhauser et al. | 709/206 |

* cited by examiner

*Primary Examiner* — Beemnet Dada
*Assistant Examiner* — Sayed Beheshti Shirazi
(74) *Attorney, Agent, or Firm* — Greenblum & Bernstein, P.L.C.

(57) ABSTRACT

An system for controlling access to a network by a user device. The system includes a criteria engine that generates a plurality of criteria to be monitored on the user device and a checker that generates at least one check for each of the plurality of criteria. The system further includes a profiler that retrieves a profile for the user device, the profile including the plurality of criteria and the at least one check for each of the plurality of criteria, a comparator that compares a summary of the retrieved profile to a summary of a profile received from the user device and a communicator that communicates a message to the user device based on the comparison.

21 Claims, 6 Drawing Sheets

NETWORK ACCESS CONTROL

FIELD OF THE INVENTION

The present disclosure relates to the field of communications. More particularly, the present disclosure relates to an apparatus, process and program to detect a status of one or more communications systems in a networked computer system and to control access to the networked computer system based on the detected status of the one or more communications systems.

BACKGROUND INFORMATION

Around the world, stakeholders, including individuals and entities, both private and public, are increasingly relying on computer networks to exchange information and to carryout transactions. Many of these stakeholders are finding it essential to maintain fast, reliable and secure communications over computer networks. The importance of maintaining fast, reliable and secure communications increases drastically where a stakeholder has facilities located in different geographic locations that must routinely communicate with each other over open networks, such as, for example, the Internet.

One approach taken by some stakeholders has been to use leased lines to maintain a wide area network (WAN). The leased lines have included, for example, integrated services digital networks (ISDN) or Optical Carrier-3 lines (OC3) provided by telephone companies. However, the stakeholders have realized that maintaining communication over leased lines can become very expensive.

Many stakeholders have created intranets and/or virtual private networks (VPNs) to maintain communication amongst their computers that are located at different geographic locations. The popularity of virtual private networks has been growing at a rapid rate since VPNs allow stakeholders to cost-efficiently communicate between computers located at considerable distances from each other over connections routed through, for example, the Internet.

Since computer security is an increasingly important consideration, due in large part to the proliferation of networks and, in particular, the Internet, and because computers are evermore increasingly connected to each other, thereby increasing a risk to any one of the computers being attacked and information being misappropriated from the computer, a reliable, efficient and secure network access control system is needed to provide for fast, reliable and secure communications over computer networks.

SUMMARY OF THE INVENTION

According to an aspect of the disclosure, an apparatus is provided for controlling access to a network by a plurality of users. The apparatus comprises a criteria engine configured to generate a plurality of criteria to be monitored for at least one user from the plurality of users, a checker configured to generate at least one check for each of the plurality of criteria, a profiler configured to retrieve a profile for the at least one user, the profile including the plurality of criteria and the at least one check for each of the plurality of criteria, a comparator configured to compare the retrieved profile to a summary of a profile received from the at least one user, and a communicator configured to communicate a message to the at least one user based on the comparison, the comparator being further configured to assign an action type to each of a plurality of discrete levels of compliance for the at least one user. The plurality of criteria comprise a security object and a timestamp of the security object, and the check comprises at least one of determining whether the security object is a particular security object, determining whether the security object was updated, determining when the security object was updated, determining the priority level of the security object, and determining a version of the security object. The security object may include at least one of an antivirus application, a firewall application, an antispyware application, an operating system status update, a registry key, an operating system version number, and an external condition. The action type may include at least one of a disconnect action, a quarantine action, and a non-action, and the discrete levels of compliance include at least two value ranges. The apparatus further comprises an interface configured to receive an instruction to one of modify, add and delete at least one of a profile, a policy, a criteria, and a check. The profile engine may be further configured to modify the retrieved profile in accordance with the received instruction. The message may be one of an affirmative message and the retrieved profile.

A second apparatus is provided for use with the apparatus for controlling access to a network by a plurality of users. The second apparatus comprises a communicator configured to receive a profile, a storage configured to store the profile, and a profile engine configured to process the profile. The profile engine may be further configured to determine a status of a plurality of portions of the second apparatus corresponding to the plurality of criteria, the determination being based upon the checks for each of the criteria. The profile engine may be further configured to generate a compliance level based on the determined status of the plurality of portions of the second apparatus. The communicator may be further configured to send the compliance level to the apparatus for controlling access to the network.

According to a further aspect of the disclosure, a method is provided for controlling access to a network by a plurality of users. The method comprises receiving a compliance level from a user, comparing the compliance level to a predetermined compliance value set, and controlling access to the network by the user based on the comparison. The compliance value set comprises at least two value ranges of compliance values, and wherein controlling access to the network comprises at least one of disconnecting the user from the network, quarantining the user, and logging the user as healthy. The method further comprises generating a policy for the user and sending a message to the user. The generating a policy comprises generating a plurality of criteria to be monitored, generating a check for each criteria of the plurality of criteria, generating an associated compliance level based on a status of the check for each criteria of the plurality of criteria, generating the predetermined compliance value set, including at least one compliance value range, and associating the at least one compliance value range with an action type, access to the network by the user being controlled based on the action type. The action type comprises one of disconnecting the user, quarantining the user, and logging the user as healthy. The message comprises one of an affirmative message and the generated policy. The plurality of criteria comprise at least one of a spyware portion, a malware portion, an antivirus portion, a specific file type portion, a user defined trigger, an operating system status portion, an update status portion, and a registry key portion.

Furthermore, a method is provided for controlling access to a network by a user that has received a policy comprising a criteria, at least one check for the criteria and a compliance level associated with a status of the at least one check. The method comprises generating a summary of a policy currently being used by the user, sending the summary of the current policy to a host when a condition changes, and receiving a message from the host. The method further comprises receiving another policy from the host, the another policy being different from the policy currently being used by the user, selecting a criteria to be checked in accordance with the received another policy, checking a status of at least one check corresponding to the selected criteria, determining a compliance level based on the checked status of the at least one check, and sending the compliance level to the host, wherein the compliance level corresponds to an action type for controlling access to the network by the user.

According to a further aspect of the disclosure, a computer readable medium is provided, comprising a plurality of program code sections, which when executed, cause access to a network by a user to be controlled. The computer readable medium comprises a compliance level receiving code section that, when executed, causes receiving a compliance level from a user, a comparing code section that, when executed, causes comparing the compliance level to a predetermined compliance value set, and an access control code section that, when executed, causes controlling access to the network by the user based on the comparison. The predetermined compliance value set comprises at least two ranges of compliance values, and the controlling access to the network comprises at least one of disconnecting the user from the network, quarantining the user, and logging the user as healthy. The computer readable medium further comprises a policy generating code section that, when executed, causes generating a policy for the user, and a message sending code section that, when executed, causes sending a message to the user, the message may be the policy. The policy generating code section comprises a criteria generating code section that, when executed, causes generating a criteria, a check generating code section that, when executed, causes generating at least one check for the criteria, and an associating code section that, when executed, causes associating at least one compliance value range with an action type, access to the network by the user being controlled based on the action type check for the criteria.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout the several views of the drawings.

DETAILED DESCRIPTION OF THE INVENTION

Various non-limiting aspects and implementations of the present disclosure are described in detail below.

In the following description of the illustrated embodiments, references are made to the accompanying drawings, which form a part hereof, and in which are shown by way of illustration, various embodiments in which the disclosure may be practiced. It is to be understood that other embodiments may be used, and structural and functional changes may be made without departing from the scope and/or spirit of the present disclosure.

Figure 1:
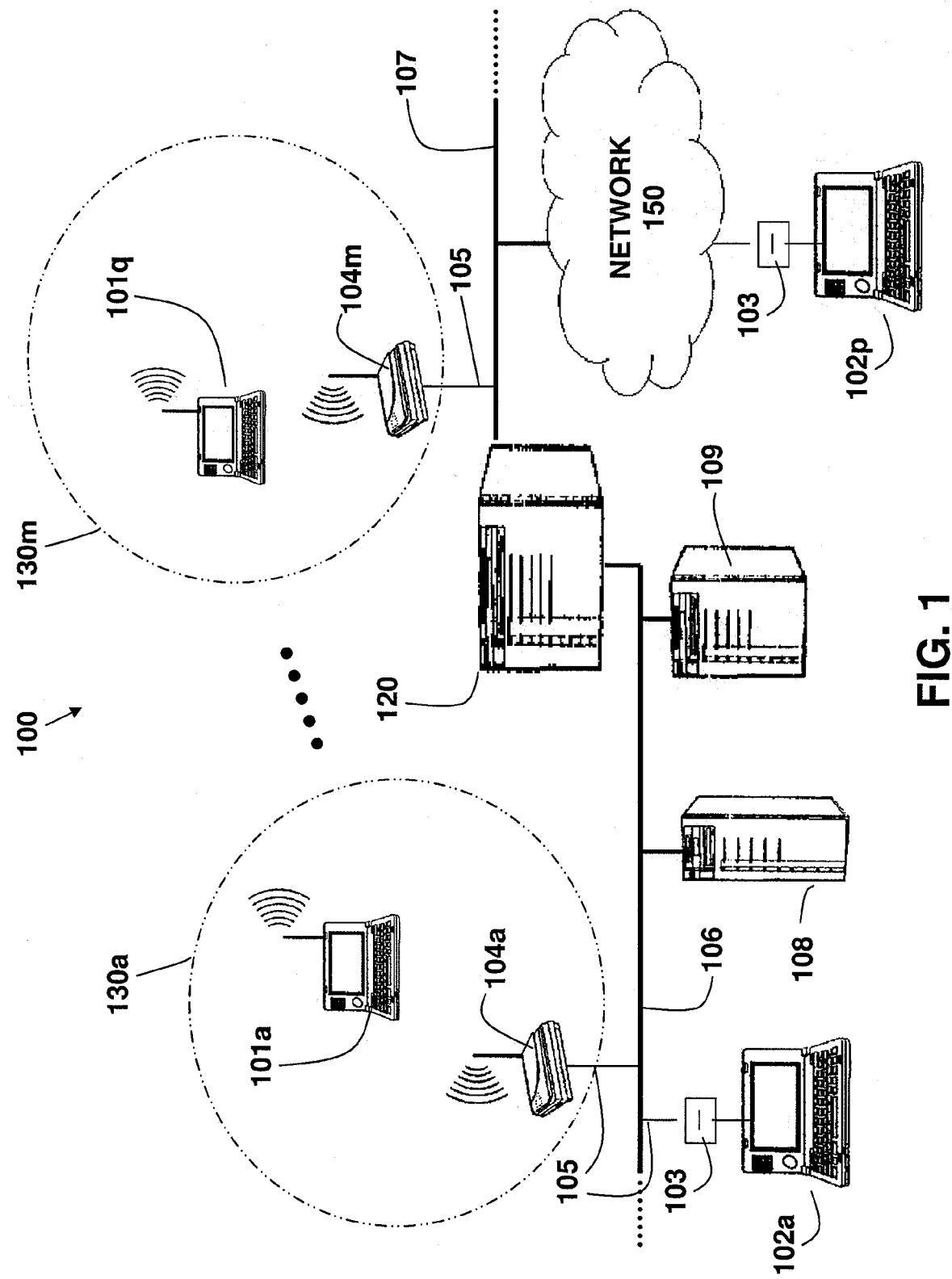
FIG. 1 illustrates an embodiment of a network system, according to an aspect of the present disclosure.

A non-limiting embodiment according to an aspect of the disclosure is shown in FIG. 1.

Referring to FIG. 1, a non-limiting embodiment of a communications system 100 is shown. The system 100 includes a plurality of Mobile End Systems (MES) 101a to 101q (any one of which is hereinafter referred to as MES 101 where a particular MES is not discussed), a plurality of Stationed Mobile End Systems (SMES) 102a to 102p (any one of which is hereinafter referred to as SMES 102 where a particular SMES is not discussed), a plurality of connection devices 103, a plurality of transceiver systems 104a to 104m (any one of which is hereinafter referred to as transceiver system 104 where a particular transceiver system is not discussed), a plurality of local area networks (LANs) 106 and 107, a Host System 108, a Mobility Management System (MMS) 109, a routing system 120 and a network 150.

Although only two LANs 106 and 107 are shown in FIG. 1, the skilled artisan will readily appreciate that any number of local area networks may be interconnected to form a larger network, such as, for example, a wide area network (WAN). Further, a plurality of transceiver systems 104a to 104m (where m is an integer greater than zero) and the plurality of local area networks 106 and 107 may be configured to form parallel, autonomous, and/or dissimilar wireless networks, within which the MES 101 may seamlessly roam, while maintaining session persistence, as described, for example, in U.S. Pat. No. 6,418,324 to Doviak et al. and/or U.S. Pat. No. 6,546,425 to Hanson et al., each of which is incorporated herein by reference in its entirety.

The MES 101 may communicate with the Mobility Management Server 109 via the LAN 106. For example, MES 101a may be linked to the LAN 106 through transceiver system 104a by radio frequency (RF) communication. However, the MES 101a may also be linked to the LAN 106 via a wired connection such as, for example, through a connection device 103 and an interconnection system 105. Accordingly, the MES 101 may be implemented in lieu of the SMES 102.

The MES 101, or the SMES 102, may be any device or combination of devices capable of communication, including, but not limited to, e.g., any one of, or a combination of a cellular telephone device, an iPhone™, a personal data assistant (PDA) device, a personal music device (PMD), a personal identification device, a motion and/or still image pickup device, a hand held computer device, a software defined radio, a vehicle mounted computer device, a desktop computer device, a workstation, a server, a router, and/or the like. Moreover, any number of Mobile End Systems may communicate wirelessly with any one or more of the transceiver devices 104a to 104m, without departing from the scope and/or spirit of the disclosure, as the skilled artisan will readily appreciate.

Further, the Mobile End System 101 may be a standard mobile device and/or off the shelf computer. For example, the MES 101 and SMES 102 may include a notebook computer equipped with a conventional radio transceiver and/or at least one network card available from any number of manufacturers, or a reconfigurable software defined radio. The MES 101 and the SMES 102 may run standard network applications and a standard operating system (or proprietary operating system and applications), and communicate on a transport layer using a conventionally available suite of transport level protocols (e.g., TCP/IP suite), or communicate on the data link layer. The MES 101 and the SMES 102 may also execute client software that enables communication with the Mobility Management System (MMS) 109, using, for example, a Remote Procedure Call (RPC) protocol and a Transport Protocol (TP), which are transported using standard transport level protocols.

According to an aspect of the disclosure, the Mobility Management System 109 communicates with the MES 101 and/or the SMES 102 using both the Remote Procedure Call (RPC) protocol and the Transport Protocol (TP). As the skilled artisan will readily appreciate, in order to simplify the description provided below, it is understood that the MES 101 and the SMES 102 are interchangeable and as such, the description provided below with regard to the MES 101 also applies to the SMES 102 without departing from the scope and/or spirit of the disclosure.

The transceiver systems 104a through 104m, which (in the disclosed embodiment) communicate wirelessly with the MES 101, are each coupled to a local area network (LAN) 106 or 107 and/or a wide area network (WAN) (not shown) via a wire-based (or wireless) interconnection system 105.

The transceiver system 104 is responsible for sending and receiving radio-frequency (RF) transmissions. The transceiver system 104 facilitates communication, e.g., between the MES 101 and, e.g., the Mobility Management System 109, the Host System 108, the SMES 102 and/or the Network 150.

U.S. Pat. No. 6,418,324 to Doviak et al., discloses an apparatus and method for transparent wireless communication between a remote device and host system that provides for, inter alia, communication over one or more parallel, dissimilar, and autonomous wireless networks, the entire disclosure of which is herein incorporated by reference.

The MES 101 of the instant disclosure may seamlessly roam and communicate over any one of coverage areas 130a to 130m, where m is an integer greater than zero, provided by the transceiver systems 104a to 104m, respectively, in a manner described with regard to, but not limited to, for example, FIGS. 29-32 and the corresponding text in the specification of U.S. Pat. No. 6,418,324.

Further U.S. Pat. No. 6,546,425 to Hanson et al., discloses a method and apparatus for providing mobile and other intermittent connectivity in a computing environment, the entire disclosure of which is incorporated herein by reference. The MES 101 may seamlessly roam and communicate over any one of, or combination of transceiver systems 104a to 104m, in a manner similar to that described with regard to, but not limited to, for example, the Mobile End Systems 104 in FIG. 1, as well as the corresponding text in the specification of U.S. Pat. No. 6,546,425.

The MES 101 is sometimes, but not always, actively connected to the Mobility Management System 109. For example, the MES 101a may communicate with Mobility Management System 109 via, e.g., transceiver system 104a coupled to the wire-based LAN 106 via the interconnection system 105. Such a mobile interconnect may allow MES 101 to seamlessly roam from the coverage area 130a to the coverage area 130m, despite the interconnect between the MES 101 being intermittent and unreliable.

Typically, there may be a temporary loss of communications when an MES 101 roams from one coverage area to another, moves out of range of the closest transceiver (such as, e.g., the transceiver system 104a), or has its signal temporarily obstructed, such as, for example, when the MES 101 temporarily moves behind a building column, or into a tunnel.

Alternatively, when connected to, for example, the LAN 106 via a non-permanent wire-based interconnection system 103, such as a docking port, a network cable connector, or the like, there may be a temporary loss of communications between the MES 101 and the Mobility Management System 109 when the MES 101 is temporarily disconnected from, e.g., the LAN 106 by breaking a connection or powering off the device.

Furthermore, the MES 101 may be nomadically coupled to the Mobility Management System 109 via a further network topography such as, e.g., a wide area network, a dial-up network, a satellite network, or the Internet.

In the exemplary embodiment, network 150 may provide intermittent service.

In another example, the MES 101 may move from one type of connection to another (e.g., from being connected to the Mobility Management System 109 via a wire-based interconnection system to being connected via network 150, or vice versa)—its connection being temporarily broken during the time it is being moved from one connection to another.

The Mobility Management System 109 may include software hosted by a conventional server running, for example, Windows NT™, Windows Vista™, or another operating system. In the preferred embodiment, the Mobility Management System 109 is a standards-compliant, client-server based intelligent server that transparently extends the enterprise network LAN 106 to a nomadic environment. The Mobility Management System 109 serves as a network-level proxy for each of the MES 101a through 101q, by maintaining the state of each MES 101 and by handling the complex session management required to maintain persistent connections to the Host System 108, which hosts the network applications, despite the mobile interconnections between the MES 101 and the transceiver system 104 being intermittent and unreliable.

For example, the Mobility Management System 109 may allow any conventional (e.g., TCP/IP or UDP/IP) network-based application to operate, without modification, over a mobile connection. The Mobility Management System 109 maintains the sessions for the MES 101 that disconnect, go out of range, or suspend operation, and resumes the sessions when the MES 101 returns to service. When, for example, MES 101a becomes unreachable, shuts down, or changes its point of presence address, the Mobility Management System 109 maintains the connection to the Host System 108 by acknowledging receipt of data and queuing requests until MES 101a once again becomes available and reachable.

The Mobility Management System 109 also extends the management capabilities of wired networks to mobile connections. Since each network software layer operates independently of others, the solution can be customized to the environment where it is deployed.

In accordance with an aspect of the present disclosure, the MES 101 communicates with the Mobility Management System 109 using conventional transport protocols such as, for example, TCP/IP, UDP/IP, or the like. Use of conventional transport protocols allows the MES 101 to communicate with the Mobility Management System 109 using, e.g., conventional backbone networks LAN 107 or network 150, and existing routing systems, such as, e.g., routing system 120, and other infrastructure already existing on an organization's network, such as, e.g., the LAN 106 or the LAN 107.

A higher-level Remote Procedure Call (RPC) protocol generates transactions into messages that are sent over, e.g., the LAN 106, via the standard transport protocol(s). In this preferred embodiment, these mobile RPC messages contain the entire network transaction initiated by an application running on, e.g., the MES 101, so that it can be completed in its entirety by the Mobility Management System 109. This enables the Mobility Management System 109 and the MES 101 to keep connection state information synchronized at all times, even during interruptions of network medium connectivity.

During communication between a MES 101 and a destination device, such as, e.g., the SMES 102*p*, it is not uncommon for a communication pathway to become mal-affected (such as, for example, by experiencing high levels of noise, traffic congestion, etc.) or cease functioning altogether.

Generally, the MES 101 is configured to use at least one preferred communications interface to maintain a connection to the Mobility Management System 109. However, should communication become impaired over a preferred communications interface (such as, e.g., failing to provide a complete end-to-end connection to a virtual private network (VPN) server for any reason) the MES 101 employs a derivative path selection (DPS) process to select a less preferred communications interface (or, a less preferred plurality of communications interfaces) in order to maintain its connection to the Mobility Management System 109.

Figure 2:
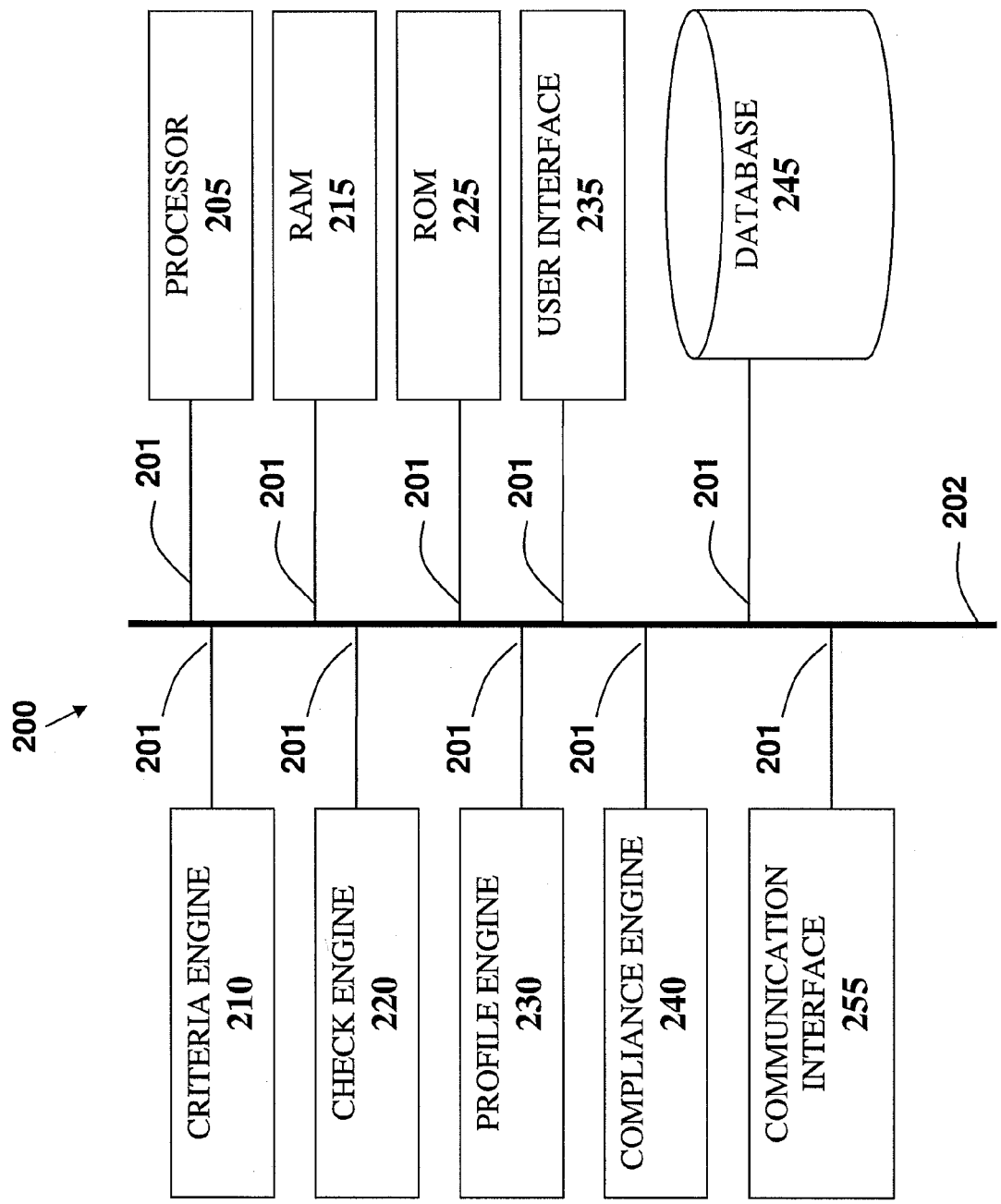
FIG. 2 illustrates an exemplary embodiment of a Mobility Management System (MMS)

According to an aspect of the disclosure, a non-limiting example of the Mobility Management System (MMS) 109 is shown as MMS 200 in FIG. 2. The MMS 200 includes a communications link 201, a bus 202, a processor 205, a Random Access Memory (RAM) 215, a Read Only Memory (ROM) 225, a User Interface 235, a database 245, a Communication Interface 255, a Criteria Engine 210, a Check (Rule) Engine 220, a Profile Engine 230 and a Compliance Engine 240. As shown in FIG. 2, the bus 202 links the individual components 205 through 255 via links 201.

The processor 205 interprets instructions, processes data and controls the processes that are carried out by the MMS 200. For example, the processor 205 communicates with the various components, which include both hardware and software components, in the MMS 200, such as for example the bus 202, the RAM 215, the ROM 225, the User Interface 235, the database 245, the Communication Interface 255, the Criteria Engine 210, the Check Engine 220, the Profile Engine 230 and the Compliance Engine 240. The processor 205 may be a single device, including hardware and software to carry-out the objectives of the disclosure. Alternatively, the processor 205 may be an array of processors that function in parallel and/or cascade. Although the processor 205 is internal to the MMS 200 in the preferred embodiment, the processor 205 may be external to the MMS 200.

The RAM 215 is the main memory used by the MMS 200 as, for example, the working area for loading, manipulating and communicating applications and data in the MMS 200. Although used as the main memory, the RAM 215 further serves as a persistent storage for data and instructions that may be necessary after execution of a set of instructions has been completed.

The ROM 225 is a non-volatile storage used by the MMS 200 to store, for example, the initial instructions necessary for the MMS 200 to power-on or otherwise begin execution. Furthermore, the ROM 225 stores other instructions and data that are required to be persistently stored.

The User Interface 235 accepts input from a user via device, such as, but not limited to, for example, a keyboard, a mouse, a tablet, or any other device capable of translating a user input into a processor-useable form. Furthermore, the User Interface 235 outputs perceivable information such as, for example, video information, sound information, and the like, to peripheral devices (not shown) so as to facilitate communication with the user.

The database 245 serves as a storage for a structured collection of records or data. The data stored in the database 245 is managed in a structured form by a database management system (DBMS), which may reside within the database 245, the processor 205. Alternatively, the database 245 may be provided external to the MMS 200 as, for example, a peripheral component.

The database 245 is used to store various types of data, including client identification data such as, but not limited to, for example, a MAC address, an IP address, an IPX address, a user name, a user address, a access point ID, a geographic location, a user group, a device class, or any other information facilitating identification of a client device and/or user. The database 245 is also used to store compliance criteria data, policy data, compliance actions, client status, policy conditions, and the like.

The Communication Interface 255 provides for communication between the internal components of the MMS 200 and components and systems external to the MMS 200. For example, the Communication Interface 255 provides for communication between the MMS 200 and the LAN 106 shown in FIG. 1, as well as the components that are in communication with the LAN 106.

The Criteria Engine 210 adds, deletes, edits, assesses and manages n criteria to be used as compliance criteria in a network access control policy for a given MES 101, where n is a positive integer greater than zero. The Criteria Engine 210 is configured to amass a large store of the n selectable criteria that may be used in building customizable checks, which are discussed at greater length later. The compliance criteria include, but are not limited to, such criteria as, for example, an antivirus status, a firewall status, an antispyware status, an operating system update status, a specific process or processes running on the MES 101, an existence of a particular file or files on the MES 101, a version of the operating system, a registry key, an external condition, and/or the like. The Criteria Engine 210, through the User Interface 235 and the Communications Interface 255, allows the user to add, delete or modify criteria that may be used in generating user profiles.

The Check Engine 220 adds, deletes, edits, assesses and manages checks within the MMS 200. In particular, the Check Engine 220 builds a check (rule) for each criteria that is to be included in each of a plurality of profiles. The check determines an action to be performed based upon a particular determination for a status or a condition of a corresponding criteria. For example, where a criteria is set to the status of an antivirus application, a possible check may include two conditions, including checking whether an antivirus application is installed on the MES 101 and whether real-time protection is enabled in the antivirus application. The exemplary check is further configured to select a specific action to be performed when one or both of the of the conditions are found to be true, including disconnecting the MES 101 from the network and/or the MMS 200, quarantining the MES 101, displaying a message on the MES 101, remediating the MES 101 by, for example, installing an antivirus application on the MES 101, launching a specific application on the MES 101, or the like.

The Profile Engine 230 adds, deletes, edits, assesses and manages profiles within the MMS 200. The Profile Engine 230 communicates with, among other components, the Criteria Engine 210 and the Check Engine 220 to build a library including a plurality of discrete profiles. Each of the plurality of discrete profiles in the library includes a set of compliance criteria and the checks corresponding to the set of compliance criteria. The library, including the plurality of discrete profiles, is stored in the database 245 for subsequent retrieval and implementation. Each of the stored profiles in the library may be categorized by a policy level identifier, such as, for example, a global policy identifier, a group policy identifier, a device-class policy identifier, a user-class policy identifier, a device policy identifier, a user policy identifier, and the like. Moreover, each of the stored profiles may be retrieved from the Database 245 using the policy level identifier and subscribed to a particular MES 101 by the Compliance Engine 240.

The Compliance Engine 240 provides for communication with the MES 101, including authenticating the MES 101, receiving Hash data from the MES 101, retrieving and assigning a profile to the MES 101, building a policy for the MES 101, logging information received from the MES 101 and sending a message to the MES 101, including a new policy where appropriate, as will be described at greater length below with reference to FIG. 4.

The received Hash data includes a result of a hashing algorithm executed by the MES 101, where the result is a digital summary or fingerprint of the policy setting on the MES 101. Based on a particular application, a particular device used for the MES 101, the particular applications running on the MES 101, and the like, the skilled artisan will readily recognize an appropriate Hash algorithm that may be implemented with the MES 101, without departing from the scope and/or spirit of the disclosure.

Although shown as separate components of the MMS 200 in FIG. 2, it is understood that the Criteria Engine 210, the Check Engine 220, the Profile Engine 230 and the Compliance Engine 240 may be configured as a single component, or they may be configured as executable sets of instructions stored in a computer readable medium that are retrievable and/or executable by the Processor 205.

Figure 3:
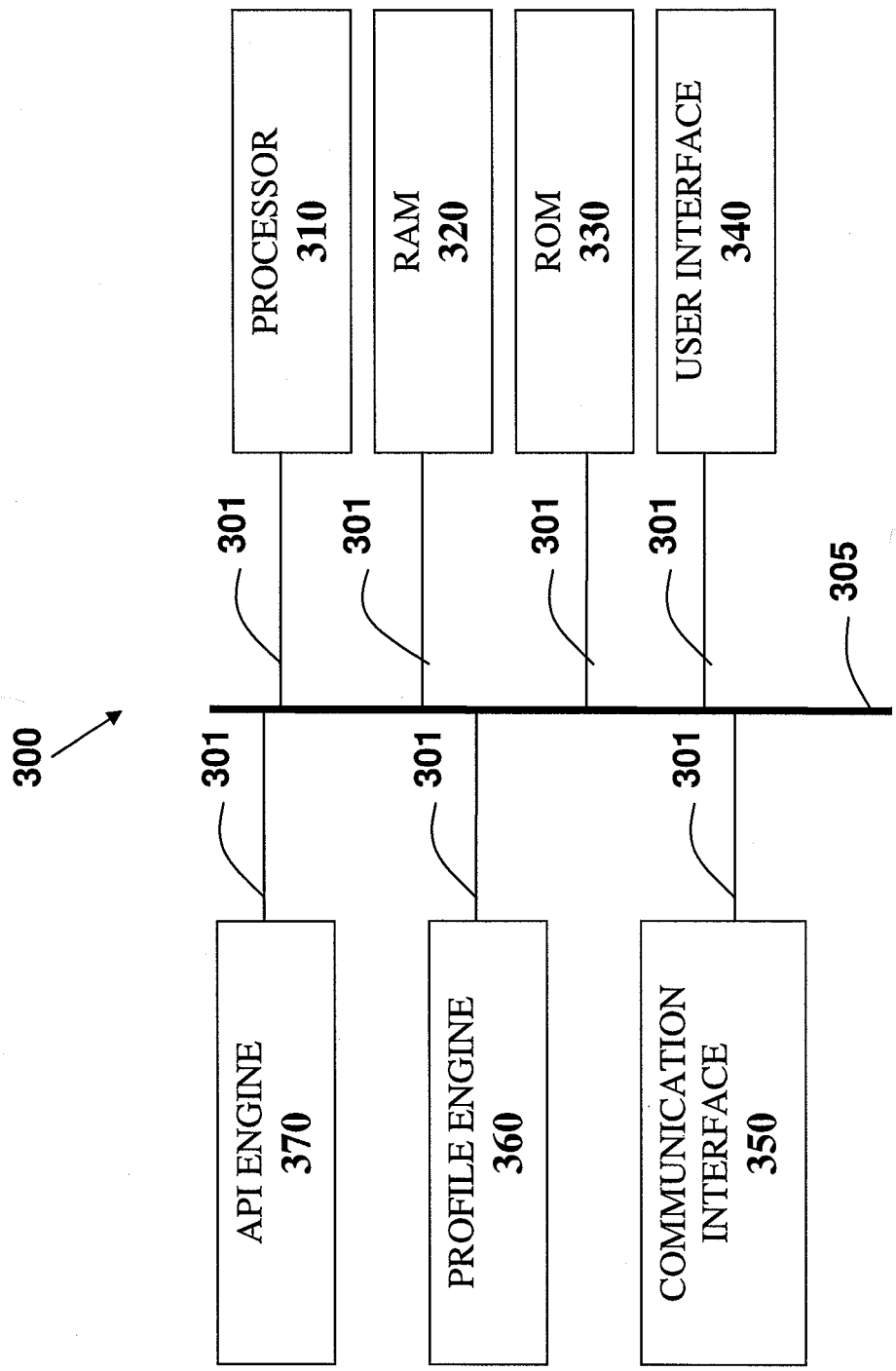
FIG. 3 illustrates an exemplary embodiment of a Mobility End System (MES)

Referring to FIG. 3, for example, a non-limiting example of an MES 101 is shown as MES 300. The MES 300 includes a processor 310, a RAM 320, a ROM 330, a User Interface 340, a Communication Interface 350, a Profile Engine 360, and an Application Program Interface (API) Engine 370, all of which are connected to a bus 305 via a link 301.

The processor 310 interprets instructions, processes data and controls the processes that are carried out by the MES 300. For example, the processor 310 communicates with the various components, which include both hardware and software components, in the MES 300, such as, for example the bus 305, the RAM 320, the ROM 330, the User Interface 340, the Communication Interface 350, the Profile Engine 360 and the API Engine 370. The processor 310 may be a single device including hardware and software to carry out the objectives of the disclosure. Alternatively, the processor 310 may be an array of processors that function in parallel and/or cascade.

The RAM 320 is the main memory used by the MES 300 as, for example, the working area for loading, manipulating and communicating applications and data in the MES 300. Although used as the main memory, the RAM 320 may further serve as a persistent storage for data and instructions that may be necessary after execution of a set of instructions has been completed.

The ROM 330 is a non-volatile storage used by the MES 300 to store, for example, instructions necessary for the MES 300 to power-on or otherwise begin execution. Furthermore, the ROM 330 stores other instructions and data that are required to be persistently stored.

The User Interface 340 accepts input from a user via devices such as a keyboard, a mouse, a tablet, or any other device capable of translating a user input into a processor-useable form. Furthermore, the User Interface 340 outputs perceivable information, such as, but not limited to, for example, video information, sound information, and the like to peripheral devices (not shown) so as to facilitate communication with the user.

The Communication Interface 350 provides for communication between the internal components of the MES 300 and components and systems external to the MES 300. For example, the Communication Interface 350 provides for communication between the MES 300 and the MMS 200 via, for example, the transceiver system 104 and the LAN 106 (shown in FIG. 1).

The Profile Engine 360 downloads a profile for the MES 300 from the MMS 200 via the Communication Interface 350. The Profile Engine 360 then processes the downloaded profile to control access to a network by the MES 300. The access to the network is based on, for example, the health or compliance of the MES 300 to an Information Technology (IT) policy. The health may be based on a status of at least one of the following on the MES 300, including, but not limited to, an antivirus application, an antispyware application, a personal firewall, an operating system patch, a customized condition, and the like.

The Profile Engine 360 provides for remediation of the MES 300 when a preset compliance level value is determined. For example, if a determination is made that the received compliance level is a "remediate" level, then the user of the MES 300 may be provide with at least one method to assist the user in rendering the MES 300 compliant with the running policy, via, for example, a pop-up webpage, an executable file, such as an install command, and the like. According to an aspect of the disclosure, a notification may be communicated to the user of the MES 300 based on predetermined checks in the running policy. The notification may be, for example, a balloon, a disconnect pop-up, a status panel, and the like, which is displayed to the user.

Furthermore, according to an embodiment of the disclosure, based on a determined compliance level, the MES 300 may restrict itself from various types of access to the network (such as, for example, receiving email services, downloading executable files, accessing secure websites, etc.), or the MES 300 may restrict itself from accessing the network entirely. The user of the MES 300 may be required to intervene after a certain compliance level is determined before the MES 300 will again access the network at the level previously set.

The API Engine 370 communicates with one or more abstraction APIs, such as, for example, OPSWAT™, Symantec™ Sygate™, Microsoft Security Center™, or the like, which aggregate endpoint APIs, and provide a single interface to detect, assess and manage security features of endpoint applications executed on, for example, the MES 300. The API Engine 370 provides the MES 300 with a single interface to detect, assess and manage the security features on the MES 300. The endpoint applications running on the MES 300 may include, for example, a firewall application that is ON/OFF/UNKNOWN, an automatic update application that is ON/OFF/UNKNOWN, a virus protection application that is ON/OFF/UNKNOWN, and/or an antispyware application that is ON/OFF/UNKNOWN.

Although shown as separate components of the MES 300 in FIG. 3, it is understood that the Profile Engine 360 and the API Engine 370 may alternatively be integral to the Processor 310, or the components may be executable instructions downloaded and stored in a computer readable medium that is retrievable and/or executable by the Processor 310.

Next, an exemplary, non-limiting process for assessing and managing a policy for a particular MES 300 will be discussed with reference to FIG. 4. The exemplary process of FIG. 4 may be carried out, for example, by the Compliance Engine 240 and/or Processor 205 in FIG. 2. However, it is understood that another process for assessing and managing a policy for a particular MES 300 may be employed, as the skilled artisan will readily recognize and appreciate, without departing from the spirit and/or scope of the disclosure.

Figure 4:
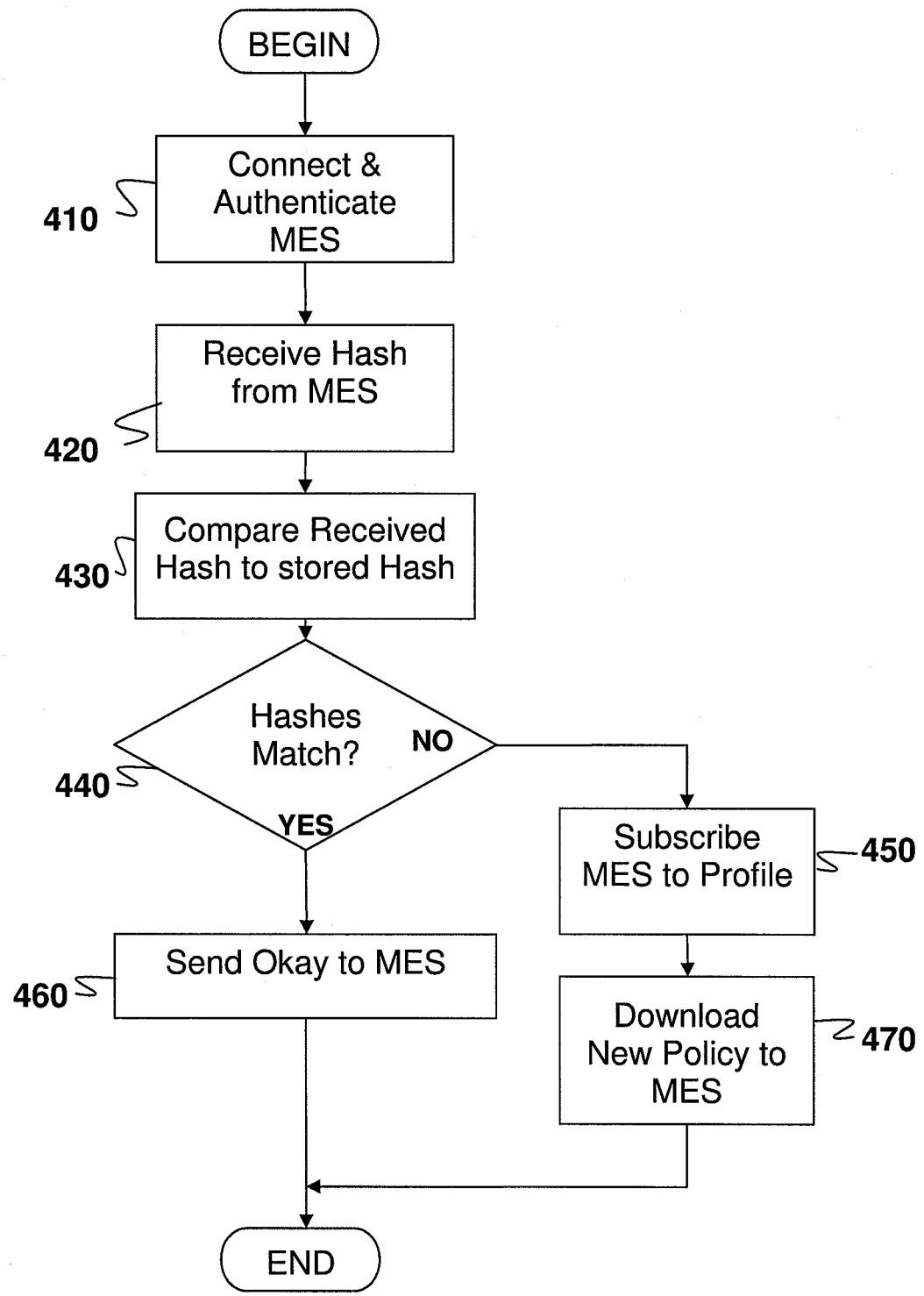
FIG. 4 is a flow diagram of a method for checking a compliance level of applications on a Mobility Management System (MMS)

Referring to FIG. 4, the exemplary process begins when a particular MES 300 connects to the MMS 200 (shown in FIG. 2). At step 410, the connected MES 300 is authenticated by receiving, for example, a username and password from the MES 300. However, rather than a username and password, any other type of identifier capable of accurately identifying a user and/or device may be used, including, e.g., a shared secret, biometric information for the user (such as, e.g., fingerprint data, retinal scan data, etc.), a code data (such as, e.g., code data transmitted from a transmitter device that is received by a receiver at the MES device, not shown), and the like.

After the MES 300 is authenticated at step 410, the MMS 200 receives a Hash from the MES 300 that describes, for example, a policy currently installed and/or running on the MES 300, at step 420. The Hash may also include, e.g., present system settings of various hardware components and/or applications running on the MES 300.

The received Hash (step 420) is compared to a policy subscribed to by the particular MES 300 at step 430. If the received Hash matches the stored policy ("Yes" at step 440), then an affirmation message is sent to the particular MES 300, otherwise the particular MES is subscribed to a particular profile at step 450 ("No" at step 440). The subscription to a profile for the particular MES 300 at step 450 may be based on any one of a number of the policy levels assigned to the plurality of profiles stored in the Database 245, including, e.g., a global policy level, a group policy level, a device-class policy level, a user-class policy level, a device policy level, a user policy level etc.

Alternatively, a customized profile may be generated for any MES 300 in real-time. For example, at step 450, a system administrator, via the User Interface 235, the Criteria Engine 210, the Check Engine 220 and the Profile Engine 230 in the MMS 200 (shown in FIG. 2), may add, delete or modify specific criteria and/or checks to generate and/or customize a profile for the particular MES 300.

After the MES 300 is subscribed to a particular profile at step 450, an associated new policy is downloaded to the MES 300 at step 470 and the process ends.

It should be noted that at step 430, it may be necessary to perform a Hash function on the policy stored in the MMS 200, which is assigned to the MES 300. It may be necessary to perform such a conversion in order to facilitate a comparison of the Hash received from the MES 300 to that of the current policy-on-file.

Further, a policy assessment and management program is provided on a computer readable medium for carrying out the above discussed process for assessing and managing a policy for an MES 300. As the skilled artisan will readily understand, the policy assessment and management program includes a code section for carrying out each of the steps 410 to 480 discussed above.

Figure 5:
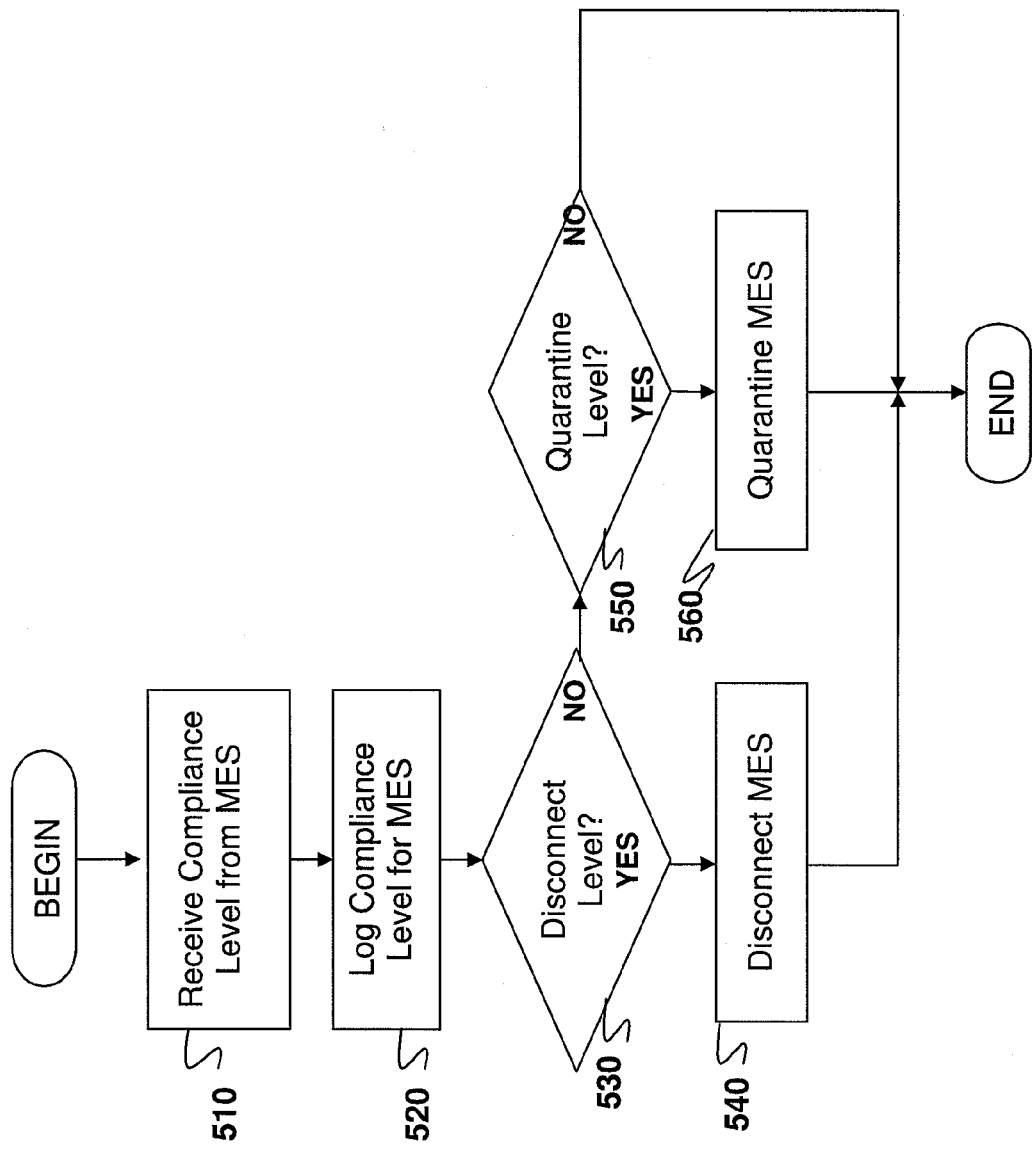
FIG. 5 is a flow diagram of a method for receiving and processing a compliance level on the Mobility Management System (MMS)

FIG. 5 shows an exemplary non-limiting compliance level reception and processing process that may be used with the MMS 200.

Referring to FIG. 5, the MMS 200 receives a compliance level from the MES 300 at step 510. The MMS 200 logs the received compliance level for the particular MES 300 at step 520, in, for example, the database 245 (shown in FIG. 2) in a record associated with the particular MES 300.

A determination is made as to whether the received compliance level is a "disconnect" level at step 530. If a determination is made that the received compliance level is a "disconnect" level ("Yes" at step 530), then the MMS 200 proceeds to disconnect the MES 300 from the network at step 540. After disconnection, the MES 300 may again be reconnected to the network through, for example, session initiation and authentication as is known in the art. However, if a determination is made that the received compliance level is not a "disconnect" level ("No" at step 530), then a determination is made as to whether the received compliance level is a "quarantine" level at step 550.

If a determination is made that the received compliance level is a "quarantine" level ("Yes" at step 550), then the particular MES 300 from which the compliance level was received will be quarantined at step 560, as is known in the relevant art, and the compliance process will end at the conclusion of step 560. Once the particular MES 300 has been quarantined at step 560, it may be necessary for a system administrator to intervene before the particular MES 300 is again allowed to access the network. The system administrator may be a person, an agent or a program, such as, for example, an expert system using artificial intelligence such as fuzzy logic or a neural network.

If a determination is made that the received compliance level is not a "quarantine" level ("No" at step 550), then a determination is made that the particular MES 300 is "healthy" or "compliant," and the process ends.

Although the exemplary, non-limiting compliance level reception and processing process discussed above was described using only three compliance levels, i.e., "disconnect," "quarantine" and a default (e.g., "healthy" or "compliant") compliance level in order to simplify the description of an aspect of the disclosure, the process may include any number of compliance levels, each of which will cause a distinct course of action to be carried out by the MMS 200, as the skilled artisan will readily recognize and appreciate, without departing from the scope and/or spirit of the disclosure.

Furthermore, the descriptors "disconnect," "quarantine," "healthy" and "compliant" have only been used to aid in understanding an aspect of the disclosure, but are in no way to be construed as limiting of any aspect of the disclosure. For example, the compliance levels may be any number in a range between 0000 and 9999, or any other identifier capable of identifying a discrete compliance level for a particular MES 300.

Further, a compliance level reception and processing program is provided on a computer readable medium for carrying out the above discussed process for receiving and processing a compliance level for an MES 300. As the skilled artisan will readily understand, the compliance level reception and processing program includes a code section for carrying out each of the steps 510 to 560 discussed above.

Figure 6:
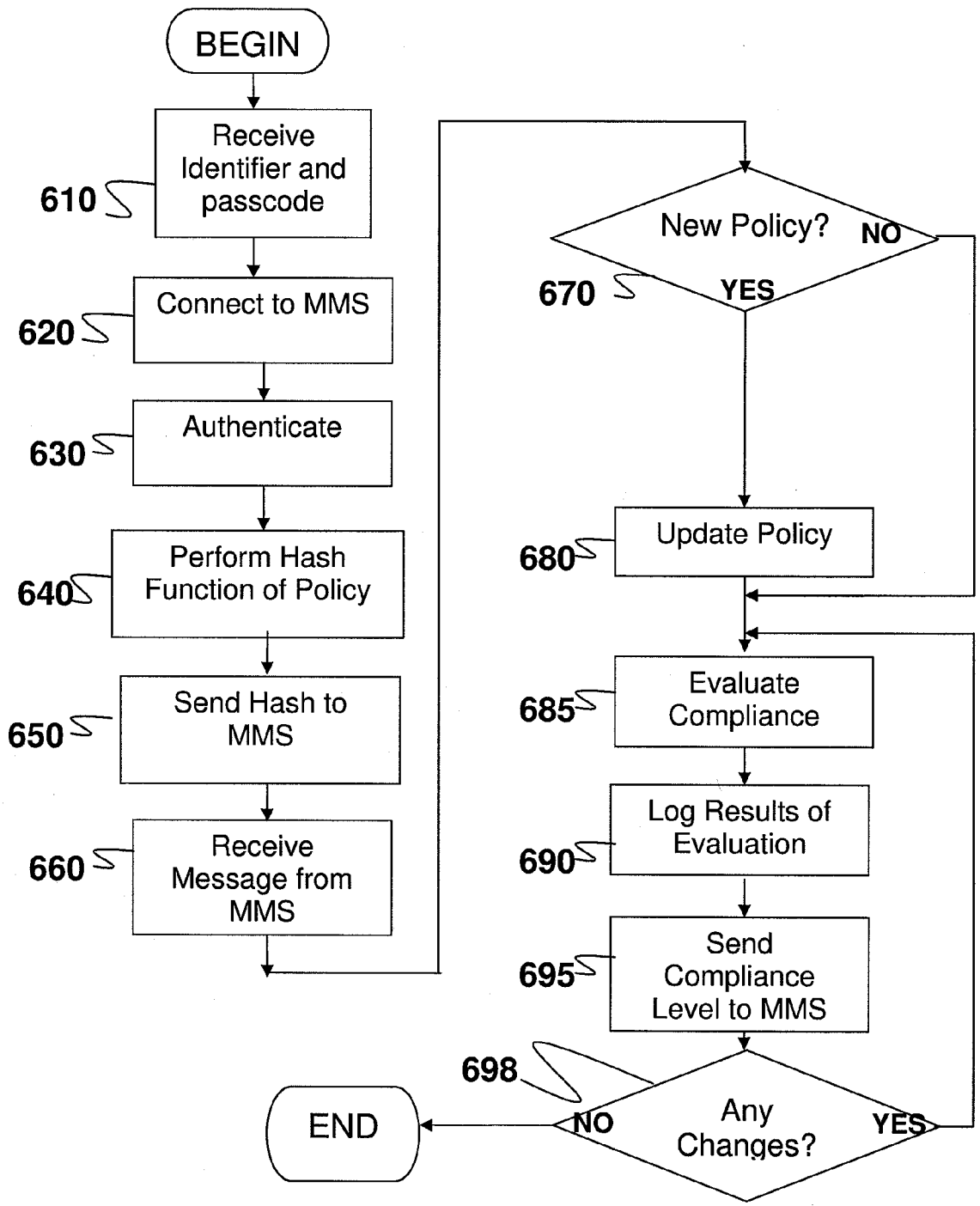
FIG. 6 illustrates a flow diagram of a method for determining a compliance level of a Mobility End System (MES) and sending the compliance level to a MMS.

FIG. 6 shows an exemplary non-limiting MES compliance process that may be used with the MES 300.

Referring to FIG. 6, the exemplary MES compliance process begins automatically, or in response to a user action, and receives a user identifier and passcode at step 610. The user identifier may be a user name, a device identifier, or any other identifier capable of facilitating identification of a unique user and/or device. Further, the passcode may be, for example, a numerical and/or textual code, a shared secret, a biometric information for the user (such as, e.g., fingerprint data, retinal scan data, etc.), a code data (such as, e.g., code data transmitted from a transmitter device that is received by a receiver at the MES device, not shown), or any other unique code capable of limiting access to authorized personnel.

After the identifier and passcode have been received (step 610), the particular MES 300 connects to the MMS 200 at step 620 and authenticates with the MMS 200 at step 630, as is known in the relevant art.

Once the MES 300 is authenticated on the MMS 200 (step 630), the MES 300 performs a policy inventory and, using, for example, a Hash algorithm, generates a Hash of the policy on the particular MES 300 at step 640. Although the Hash algorithm (function) is shown as being performed at step 640, after authentication of the particular MES 300 on the MMS 200 (step 630), the Hash function may be performed at any point prior to communication of the particular MES 300 with the MMS 200 in order to generate a current Hash.

The Hash is sent from the particular MES 300 to the MMS 200 at step 650. The MES 300 then waits until a message is received from the MMS 200 at step 660. The received message, according to the exemplary embodiment, is one of an affirmation message or a new policy for the particular MES 300.

A determination is made, at step 670, as to whether the received message is a new policy. If a determination is made that the received message is a new policy ("Yes" at step 670), then the MES 300 updates (or replaces) the existing policy with the downloaded policy at step 680. After the existing policy has been updated, or replaced (step 680), the compliance of the MES 300 is evaluated at step 685.

On the other hand, if it is determined at step 670 that the received message is not a new policy ("No" at step 670), then the process proceeds to step 685.

The MES 300 evaluates the compliance of various parameters on the device, at step 685, by checking the status of each of a plurality of criteria according to corresponding checks (rules) defined in the policy currently running on the MES 300 and determining a numerical compliance value, e.g., having a value in the range from 0000 to 9999. The determination of the numerical compliance value is based on the status of the corresponding checks defined in the policy for criteria. The results of the evaluation are logged in the MES 300 at step 690, and the determined numerical compliance level is sent to the MMS 200 at step 695. The numerical compliance level value is sent to the MMS 200 along with a message from the MES 300. The message may include, for example, "client device not running firewall," or any other message indicating a status of an application, file, device, or any other portion of the MES 300.

At step 698, the MES 300 continuously checks for any changes in any of the criteria in accordance with the policy running on the device. If a determination is made that a status in one of the criteria has changed ("Yes" at step 698), the process returns to step 685 and reevaluates the compliance of the various parameters, and repeats steps 690 and 695, otherwise the process ends ("No" at step 698).

Alternatively, rather than continuously checking the status of the various parameters, the MES 300 may, instead, respond to one or more triggers at step 685. The triggers may be, for example, messages received from any one or more of the applications, devices, etc. the parameters of which are to be checked under the running policy, or from an agent that monitors any one or more of the applications, devices, etc.

Further, an MES compliance processing program is provided on a computer readable medium for carrying out the above discussed process for receiving and processing a compliance level for an MES 300. As the skilled artisan will readily understand, the compliance level processing program includes a code section for carrying out each of the steps 610 to 698 discussed above.

It is understood that aspects of the present disclosure may be used to control access to a network by a mobility client based on the client's health or compliance to, for example, entity information technology (IT) policy, where the entity comprises, for example, a corporation, an institution, a network, and the like. The control may be based on any one of, or combination of, the following applications running on the client device, such as, for example, the antivirus application(s), the antispyware application(s), the personal firewall, particular operating system patches, or custom conditions.

In determining a health or compliance of the client to, for example, an entity IT policy, attributes of particular applications running on the client may be considered and assessed. For example, a determination may be made as to the particular antivirus, antispyware and/or firewall applications that are currently installed on the client device, including the vendor name, product name version, date of last scan, date of last virus. A determination may be made as which of the applications are currently running on the client device.

Furthermore, other attributes of other applications running on the client device may be considered and assessed, such as, for example, the operating system version, the platform, the mobility version, the registry key, the processes currently running, the auto-update status, the status of operating system patches, the status of user-defined conditions.

Based on the determination of the health or compliance of the client device, the client may be disconnected and/or quarantined from the network. Further, the client device may be allotted restricted access to only particular applications, services or networks. Moreover, the client device may be provided with methods to become compliant, such as, for example, a pop-up web page, an executable file, and the like.

The particular status(es) of the client device may be manifested to a user through user notifications, such as, for example, a balloon, a disconnect pop-up, a status panel, and the like. The status(es) are logged and reported in the client device and/or the mobility management system.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather, the disclosure extends to all functionally equivalent structures, methods, and uses such as are within the scope of the appended claims.

In accordance with various embodiments of the present disclosure, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present disclosure as described herein are optionally stored on a tangible storage medium, such as: a magnetic medium such as a disk or tape; a magneto-optical or optical medium such as, for example, a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Accordingly, replacement standards and protocols having the same functions are considered equivalents.

What is claimed is:

1. An apparatus for controlling access to a network by a plurality of users, comprising:
    a criteria engine configured to generate a plurality of criteria to be monitored for at least one user from the plurality of users;
    a checker configured to generate at least one check for each of the plurality of criteria;
    a profiler configured to retrieve a profile for the at least one user, the profile including the plurality of criteria and the at least one check for each of the plurality of criteria;
    a comparator configured to compare the retrieved profile to a summary of a profile received from the at least one user;
    a communicator comprising a signal transmitter, the communicator being configured to communicate a message from the signal transmitter to the at least one user based on the comparison;
    the comparator being further configured to assign an action type to each of a plurality of discrete levels of compliance for the at least one user; and
    an interface configured to receive an instruction to one of modify, add and delete at least one of a profile, a policy, a criteria, and a check,
    wherein the action type includes at least one of a disconnect action, a quarantine action, and a non-action, and the discrete levels of compliance include at least two value ranges.

2. The apparatus according to claim 1, wherein:
    the plurality of criteria comprise a security object and a timestamp of the security object; and
    the check comprises at least one of determining:
        whether the security object is a particular security object;
        whether the security object was updated;
        when the security object was updated;
        the priority level of the security object; and
        a version of the security object.

3. The apparatus according to claim 2, wherein the security object includes at least one of an antivirus application, a firewall application, an antispyware application, an operating system status update, a registry key, an operating system version number, and an external condition.

4. The apparatus according to claim 1, the profile engine being further configured to modify the retrieved profile in accordance with the received instruction.

5. The apparatus according to claim 1, wherein the message is one of an affirmative message and the retrieved profile.

6. A system comprising a first apparatus and a second apparatus,
    the first apparatus being structured and arranged for controlling access to a network by a plurality of users and comprising:
        a criteria engine configured to generate a plurality of criteria to be monitored for at least one user from the plurality of users;
        a checker configured to generate at least one check for each of the plurality of criteria;
        a profiler configured to retrieve a profile for the at least one user, the profile including the plurality of criteria and the at least one check for each of the plurality of criteria;
        a comparator configured to compare the retrieved profile to a summary of a profile received from the at least one user;
        a communicator comprising a signal transmitter, the communicator being configured to communicate a message from the signal transmitter to the at least one user based on the comparison;
        the comparator being further configured to assign an action type to each of a plurality of discrete levels of compliance for the at least one user; and
        an interface configured to receive an instruction to one of modify, add and delete at least one of a profile, a policy, a criteria, and a check,
        wherein the action type includes at least one of a disconnect action, a quarantine action, and a non-action, and the discrete levels of compliance include at least two value ranges; and
    the second apparatus being structured and arranged for use with the first apparatus and comprising:
        a communicator configured to receive a profile;
        a storage configured to store the profile; and
        a profile engine configured to process the profile.

7. The second apparatus according to claim 6, the profile engine being further configured to determine a status of a plurality of portions of the second apparatus corresponding to the plurality of criteria, the determination being based upon the checks for each of the criteria.

8. The second apparatus according to claim 7, the profile engine being further configured to generate a compliance level based on the determined status of the plurality of portions of the second apparatus.

9. The second apparatus according to claim 8, the communicator being further configured to send the compliance level to said apparatus for controlling access to the network.

10. The apparatus according to claim 1, further comprising a processor structured and arranged to at least one of process and control data from the criteria engine, the checker, the profiler, the comparator, and the communicator.

11. A method for controlling access to a network by a plurality of users, comprising:
    receiving, via a signal receiver, a compliance level from a signal transmitted from a user;
    comparing the compliance level to a predetermined compliance value set;
    controlling access to the network by the user based on the comparison; and
    generating a policy for the user; and
    sending a message to the user,
    wherein the generating of the policy comprises:
        generating a plurality of criteria to be monitored;
        generating a check for each criteria of the plurality of criteria;

generating an associated compliance level based on a status of the check for each criteria of the plurality of criteria;

generating the predetermined compliance value set, including at least one compliance value range; and associating the at least one compliance value range with an action type, access to the network by the user being controlled based on the action type.

12. The method according to claim 11, wherein the compliance value set comprises at least two value ranges of compliance values, and wherein controlling access to the network comprises at least one of disconnecting the user from the network, quarantining the user, and logging the user as healthy.

13. The method according to claim 11, wherein the action type comprises one of disconnecting the user, quarantining the user, and logging the user as healthy.

14. The method according to claim 11, wherein the message comprises one of an affirmative message and the generated policy.

15. The method according to claim 11, wherein the plurality of criteria
comprise at least one of:
a spyware portion;
a malware portion;
an antivirus portion;
a specific file type portion;
an operating system status portion;
a user defined trigger;
an update status portion; and
a registry key portion.

16. A method for controlling access to a network by a user that has received a policy comprising a criteria, at least one check for the criteria and a compliance level associated with a status of the at least one check, the method comprising:
generating a summary of a policy currently being used by the user;
sending via a signal transmitter the summary of the current policy to a host when a condition changes;
receiving via a signal receiver a message from the host;
receiving another policy from the host, the another policy being different from the policy currently being used by the user;
selecting a criteria to be checked in accordance with the received another policy;
checking a status of at least one check corresponding to the selected criteria;
determining a compliance level based on the checked status of the at least one check; and
sending the compliance level to the host, wherein the compliance level corresponds to an action type for controlling access to the network by the user.

17. A non-transitory computer readable medium comprising a plurality of program code sections, which when executed by a processor, cause access to a network by a user to be controlled, the tangible computer readable medium comprising:
a compliance level receiving code section that, when executed, causes receiving via a signal receiver a compliance level from a user;
a comparing code section that, when executed, causes comparing the compliance level to a predetermined compliance value set; and
an access control code section that, when executed, causes controlling access to the network by the user based on the comparison;
a policy generating code section that, when executed, causes generating a policy for the user; and
a messaging code section that, when executed, causes sending a message to the user,
wherein, when executed, the policy generating code section further causes:
generating a plurality of criteria to be monitored;
generating a check for each criteria of the plurality of criteria;
generating an associated compliance level based on a status of the check for each criteria of the plurality of criteria;
generating the predetermined compliance value set, including at least one compliance value range; and
associating the at least one compliance value range with an action type, access to the network by the user being controlled based on the action type.

18. The non-transitory computer readable medium according to claim 17, wherein the predetermined compliance value set comprises at least two ranges of compliance values, and wherein controlling access to the network comprises at least one of disconnecting the user from the network, quarantining the user, and logging the user as healthy.

19. The non-transitory computer readable medium according to claim 17, further comprising:
a policy generating code section that, when executed, causes generating a policy for the user; and
a message sending code section that, when executed, causes sending a message to the user.

20. The non-transitory computer readable medium according to claim 19, wherein the policy generating code section comprises:
a criteria generating code section that, when executed, causes generating a criteria;
a check generating code section that, when executed, causes generating at least one check for the criteria; and
an associating code section that, when executed, causes associating at least one compliance value range with an action type, access to the network by the user being controlled based on the action type check for the criteria.

21. The non-transitory computer readable medium according to claim 19, wherein the message is the generated policy.

* * * * *